United States Patent Office
3,017,323
Patented Jan. 16, 1962

3,017,323
THERAPEUTIC COMPOSITIONS COMPRISING POLYHYDRIC ALCOHOL SOLUTIONS OF TETRACYCLINE-TYPE ANTIBIOTICS
Philip N. Gordon, Old Lyme, and Charles R. Stephens, Jr., Niantic, Conn., and Melvin M. Noseworthy, Brooklyn, and Fred W. Teare, Jamaica, N.Y., assignors to Chas. Pfizer & Co., Inc., New York, N.Y., a corporation of Delaware
No Drawing. Filed July 2, 1957, Ser. No. 669,460
8 Claims. (Cl. 167—65)

This invention is concerned with certain antibiotic-containing therapeutic compositions. More particularly, it relates to highly stable orally, topically, and parenterally administrable solutions of certain metal salts or complexes of tetracycline and oxytetracycline.

This application is a continuation-in-part of copending application Serial Number 478,498, filed December 29, 1954, by Philip N. Gordon and Charles R. Stephens, Jr., and now abandoned where non-toxic compounds of oxytetracycline with mineral acid salts of polyvalent metals having a metal salt to oxytetracycline ratio of about 0.5 to about 3 are disclosed and claimed. That application in turn is a continuation-in-part of application Serial Number 316,554, filed October 23, 1952, and now abandoned. The administration of these compounds dissolved in non-aqueous hydroxylic solvents, such as propylene glycol is also disclosed. It has now been found that certain of these compounds of oxytetracycline containing calcium, magnesium, zinc or aluminum or combinations thereof, and in addition certain similar compounds of tetracycline containing calcium, magnesium, or aluminum dissolved in certain solvents of the above type yield dosage formulations which have surprisingly improved and advantageous properties as compared to similar formulations containing other of the metal salts of the above copending application or to other tetracycline antibiotic dosage formulations heretofore known.

The specific solvents which have been discovered to be useful are the polyhydric aliphatic alcohols and mixtures thereof. Especially satisfactory are the glycols, preferably those generally recognized as pharmaceutically acceptable, such as polyethylene glycol, propylene glycol and mixtures thereof. Glycerine is another notable example of a polyol which is particularly useful in the present invention. These solvents may be modified by the addition of up to about 20% by volume of other alkanols such as sorbitol, preferably as a 70% aqueous solution in those forms where this proportion of water is not deleterious, or ethanol. Toxic alkanols such as methanol or ethylene glycol are of course avoided. For the preparation of compositions having a plastic solid-like consistency such as salves or suppositories the high molecular weight polyethylene glycols (Carbowaxes) are employed.

Those metal salts or complexes of tetracycline which are contemplated in these novel compositions are three in number: magnesium tetracycline, calcium tetracycline, and aluminum tetracycline wherein the molar ratio of metal to antibiotic is about 3 to 1. It is surprising but true that the other known magnesium, calcium, and aluminum salts, e.g. where the ratio of metal to tetracycline is 1:1, 1:2, 1:3, 2:1 or 2:3, do not permit the obtainment of the remarkably improved therapeutic agents of this invention. The same is not true, however, of the magnesium and calcium salts of oxytetracycline. A variety of these may be employed in the present invention and the precise ratio of metal to antibiotic does not adversely affect the final products. This also applies to zinc oxytetracycline and aluminum oxytetracycline which can also be used in the compositions of the present invention. Thus, the molar ratio of metal to oxytetracycline generally may be 1:1, 2:3, 2:1, 3:2, 3:1, etc. It is usually preferred to have a molar ratio of metal to oxytetracycline of about 1:3 to 3:1. Mixed salts of two of the metals with either antibiotic may be employed as well such as calcium-magnesium-oxytetracycline 1:1:3 or magnesium-zinc-oxytetracycline 1:1:3. Thus when speaking of the metal to tetracycline or oxytetracycline ratio, what is meant is *total* metal and not one single metal in those instances where mixed salts are employed.

The novel antibiotic metal salt solutions are particularly advantageous because of their remarkable stability over long periods of time and under varying atmospheric conditions. In animals and humans they provide blood levels comparable to those achieved with the best previously available tetracycline and oxytetracycline dosage forms, when administered orally. For topical application their efficacy is also comparable to topical and non-systemic dosage formulations of the two antibiotics heretofore known. They are particularly useful as otic or veterinary ophthalmic solutions and in human beings as otic solutions and mouth washes, as disinfectants and for skin wounds and sores. These new compositions may also be administered intramuscularly or, when diluted with water, intravenously. Their value extends not only to humans, but especially to the treatment of cattle, sheep, goats, hogs, horses, poultry, house pets and other animals. Compared to the antibiotic solutions and suspensions heretofore available, their stability and shelf life are outstanding. They are not subject to deterioration, hence their potency remains essentially constant. Nor are they subject to salting or settling out, hence the usual problems of resuspension and resolution are obviated and uniform oral and topical dosage levels are at last realized.

These new compositions may be prepared simply by dissolving the desired preformed metal salt of the tetracycline or oxytetracycline in the desired polyhydric aliphatic alcohol. To effect solution more rapidly, gentle heat may be applied. Depending on the choice of solvent, the choice of antibiotic and the concentration desired, generally temperatures from about 20° to 50° C. are preferred. Above 50° C. decomposition of the antibiotic may set in. The concentration of the solution may be varied, according to the desired use, anywhere from a highly dilute to a saturated state, and sometime a supersaturated solution is feasible. For the oxytetracycline compositions of the present invention, the useful concentration range is from about 5 to 100 mg./ml. For the tetracycline compositions the practical working range is about 5–50 mg./ml. Other ingredients commonly employed in oral and topical tetracycline-type antibiotic dosage formulations may also be incorporated in the solutions of course. Examples of these are other antibiotics like streptomycin, polymixin B sulfate, carbomycin and oleandomycin; steroid hormones like prednisolone, cortisone and hydrocortisone; buffering agents and other stabilizers such as ascorbic acid, triethanolamine, diethanolamine, etc.

According to one preferred method of preparing the new solutions, the chosen metal salt of the antibiotic is prepared in situ by simply dissolving tetracycline or oxytetracycline free base, or an acid salt thereof, in the selected glycol or glycerol and adding a salt of the desired metal which is soluble in the particular polyol. This reaction usually occurs readily at room temperature, or at the aforesaid temperatures up to about 50° C. which may be used for accelerating the process. The ratio of metal salt to antibiotic is generally that desired in the final product, although some excess of metal salt is well tolerated.

The pH conditions in the solution are quite important in controlling the reaction, where the antibiotic salt is formed in situ, and in obtaining the optimum stability for the product. Generally neutral to alkaline conditions are desirable, e.g., a pH range of 5.0 to 10.0. For most satisfactory solutions at pH 7.0 to 10.0 are preferred.

Surprisingly enough, closely related tetracycline antibiotic salts have been tested and found either not to produce stable solutions or not to form solutions at all in therapeutically acceptable polyol vehicles. Thus, magnesium chlortetracycline, calcium chlortetracycline and zinc tetracycline salts are inoperative.

The following examples are given simply to illustrate this invention and not in any way to limit its scope.

*Example I*

A particularly important field for several of the novel compositions of this invention lies in the treatment of pink eye, a mixed eye infection commonly encountered in sheep and cattle. The following formulation has been notably successful for this purpose. It is easily administered by means of a simple atomizer or the like, because of its unusual stability.

Material: Gm./liter
 Oxytetracycline hydrochloride [1]_____ 28.49
 Magnesium chloride hexahydrate [2]_____ 10.50
 Sodium hydroxide [3]_____ approx. 5.00
 Polyethylene glycol 400,[4] q.s. 1 liter.

[1] Pfizer Terramycin, Pharmaceutical grade 895 u./mg.
[2] Analytical reagent grade.
[3] USP XV grade.
[4] Carbide and Carbon Chemicals Co., U.S.P. XV.

(If desired, there may also be included color stabilizers such as sodium phosphite, sodium bisulfite, ascorbic acid, sodium formaldehyde sulfoxylate and other antioxidants. It should be noted, there may also be tolerated up to approximately 25% by volume of water, but it is preferred to have only about 10–15% present.)

Procedure:
(1) Dissolve the magnesium chloride hexahydrate in the polyethylene glycol 400 at 60° C. with stirring.
(2) When the above solution is complete cool to 40° C., add the oxytetracycline hydrochloride and agitate rapidly.
(3) Begin to neutralize immediately by adding a 50 percent wt./wt. solution of sodium hydroxide (500 gm. NaOH in 500 ml. H₂O) and bring to pH 7.5. (This may be checked by taking the pH of a 50% aqueous solution of the preparation which should be in the range of pH 7.5 to 8.)
(4) When the solution is complete, carefully neutralize to pH 8.5. (This may be checked by taking the pH of a 50% aqueous solution of the preparation which should have a pH of 8.5 to 9.)
(5) Subdivide and package. The preparation at this stage is a deep yellow green solution which retains its color under all storage conditions.

Three such pink eye solutions were tested for stability with the following results:

| Lot No. and Temp. | Initial Bioassay, mg./gm. | Retained Bioactivity | |
|---|---|---|---|
| | | 4 weeks | 9 weeks |
| 1 {25° C | 22.6 | 22.28 (99%) | 21.61 (96%) |
| 37° C | | 22.45 (99%) | 21.63 (96%) |
| 50° C | | 22.47 (99%) | 21.60 (96%) |
| 2 {25° C | 22.4 | 22.3 (99%) | 21.60 (96%) |
| 37° C | | 22.9 (102%) | 23.15 (103%) |
| 50° C | | 23.07 (103%) | 21.40 (95%) |
| 3 {25° C | 22.5 | 22.33 (99%) | 21.85 (97%) |
| 37° C | | 23.17 (103%) | 21.67 (96%) |
| 50° C | | 23.30 (104%) | 21.75 (97%) |

The assay data above was gathered at each time interval so that each assay was obtained on the same day. This enables better statistical analysis of the data. Each assay figure is the average of six assays (three duplicates).

*Example II*

Another major use for many of the novel compositions of this invention is for oral administration to animals and humans. In those diverse fields of therapy for which tetracycline and oxytetracycline are especially prescribed, it is often desirable to administer the antibiotics orally. However, two serious problems are then encountered: chemical instability of the available oral dosage forms, whereby potency is quite rapidly lost on storage; and physical instability thereof, whereby the antibiotic tends to precipitate or settle out from the solution or suspension so that uniform doses over an appreciable period of time are difficult to obtain. There is also great objection to the taste of many such orally administrable preparations.

The following solutions, made according to this invention, are particularly effective in oral therapy and yet overcome these disadvantages.

A. Material:

Oxytetracycline, amphoteric (910 u./mg.)
 grams per 12 liters__ 480.000
Magnesium chloride .4H₂O_____do____ 105.000
Sorbitol (70% aqueous solution)_____do____ 1200.000
Sodium cyclamate _____do____ 45.000
Sodium saccharin _____do____ 4.500
Sodium ascorbate _____do____ 240.000
F.D. & C. Red No. 1_____do____ 2.000
F.D. & C. Red No. 2_____do____ 6.000
Sodium hydroxide (as 5% sol'n)_____do____ 50.000
Maraschino cherry No. 9110_____cc__ 20.400
Cosmo N.A. flavor, imit. maraschino No. 1991
 cc__ 3.600
Glycerine, q.s. 12000.000 cc.
Ethyl alcohol (200 proof)_____cc__ 960

Procedure:
(1) Pass the amphoteric oxytetracycline through a Bantam type mill using 0.0100" HB stainless steel screen.
(2) Mill the magnesium chloride using a 0.12" HB stainless steel screen.
(3) Add in the following order, the sorbitol, sodium ascorbate, saccharin, sucaryl and the dyes (passed first through a screen to remove the lumps) to 6 liters of glycerine. Thoroughly blend.
(4) Dissolve 70 gms. of sodium hydroxide in 1400 cc. of glycerine by stirring at 75° C.
(5) Add 400 cc. of the ethyl alcohol to the oxytetracycline and stir until all of the antibiotic is wet with alcohol.
(6) Dissolve the magnesium chloride in 400 cc. of the ethyl alcohol and add it to the rapidly stirring antibiotic suspension. Continue to stir until a complete solution is obtained. Use ½ the remaining ethanol to wash the magnesium chloride container and add it to the antibiotic solution. Wash the container with the remaining ethanol and again with 1 liter of glycerine. Saturate with N₂ gas.
(7) Add sufficient of the sodium hydroxide solution from (4) (approx. 840 cc.), to give an apparent pH of 7.5.
(8) Add the flavoring agents, q.s. with glycerine to 12 liters sparkle, and bottle under nitrogen.
 Final pH 7.5 (apparent; 50% in water).
 Final density 1.25–1.26.
 Final viscosity 400–430 cps.

B. Material:

Oxytetracycline hydrochloride (895 u./mg.)
 grams per 12 liters__ 362.000
Magnesium chloride .4H₂O_____do____ 64.100
Sodium cyclamate, U.S.P._____do____ 120.000
Sodium hydroxide, C.P._____do____ 250.000
F.D. & C. Red #1 (Kohnstamm)____do____ 2.040
F.D. & C. Red #2 (Kohnstamm)____do____ 4.200

Maraschino cherry #1991 _____ cc__ 28.800
Glycerine, q.s. to 12,000.000 cc.
Menthol _____ mg__ .600

Procedure:
(1) Prepare the sodium hydroxide solution by dissolving 250 gms. of sodium hydroxide in 5 liters of glycerine at 75° C. with stirring.
(2) To 6 liters of glycerine, with thorough stirring, add the following, lump free, in order: Dyes, sucaryl and magnesium chloride.
(3) Pass $N_2$ gas over the surface of the solution and cool to 25° C.
(4) With rapid stirring, add the oxytetracycline hydrochloride.
(5) Immediately add the 5% sodium hydroxide solution to pH 8.5–8.7. (Approximately 1.0 liter.)
(6) Add the flavors with stirring, q.s. to 12 liters with glycerine, sparkle through a diatomaceous earth filter aid (Supercel bed) and bottle under a head of nitrogen.
Final pH 8.5–8.7 (50% in water).
Final density 1.25–1.27.

Bio-stability tests, after storage at 37° C. on three representative formulations of these types demonstrate the marked increases in stability realized with the products at this invention:

| | 1 | 2 | 3 |
|---|---|---|---|
| | Mg./gm. | Mg./gm. | Mg./gm. |
| Initial assay | 23.2 | 23.6 | 23.4 |
| 2 Weeks | 23.5 | 23.6 | 23.3 |
| 4 Weeks | 22.3 | 21.4 | 21.3 |
| 8 Weeks | 22.4 | 19.3 | 21.7 |
| 12 Weeks | 22.8 | 22.4 | 23.1 |

*Example III*

The following demonstrate still others of the new orally and topically administrable dosage forms, illustrating the use of different salts of oxytetracycline and different polyhydric alcohol solvents and the presence of other ingredients in the products.

A. 1Ca : 1 OXYTETRACYCLINE

Formula:
(1) U.S.P. glycerin _____ liters__ 1
(2) Sodium cyclamate _____ g__ 20
(3) Calcium acetate .$H_2O$_____ 20.66
(4) Oxytetracycline hydrochloride_____ 60.2
(5) Sodium hydroxide (10% in glycerin) to pH 9.0 _____ cc__ 150
(6) Glycerin, q.s. to 2 liters.

Procedure: Dissolve with stirring in the U.S.P. glycerin (1.) the remaining ingredients in numerical sequence as listed.

Stability data:

| | Bio., mg./g. | Chem., mg./g. |
|---|---|---|
| IA | 19.8 | 21.3 |
| 2 Wks., 37° C | 20.2 | 22.2 |
| 4 Wks., 37° C | 17.2 | 23.0 |
| 8 Wks., 37° C | 19.6 | 21.8 |
| 12 Wks., 37° C | 19.6 | 21.4 |
| 6 Months, 37° C | 16.5 | 19.3 |
| 6 Months, 25° C | 19.6 | |

B. 2Ca : 3 OXYTETRACYCLINE

Formula:
(1) U.S.P. glycerine _____ cc__ 500
(2) Sorbitol _____ g__ 50
(3) Sodium cyclamate _____ g__ 10
(4) Calcium chloride, anh._____ g__ 4.84
(5) Oxytetracycline hydrochloride_____ g__ 30.1
(6) Sodium hydroxide (10% in glycerine) to pH 8.5.
(7) Glycerine, q.s. to 1 liter.

Procedure: Dissolve with stirring in No. 1, the remaining ingredients in numerical sequence.

Stability data at 37° C.:

| | Bioassay, mg./g. | Chem. Assay, mg./g. |
|---|---|---|
| Initial | 19.2 | 26.0 |
| 2 Weeks | 18.2 | 24.7 |
| 4 Weeks | 15.9 | 17.44 |
| 8 Weeks | 16.4 | 19.2 |
| 12 Weeks | 16.6 | 17.9 |

C. 2Mg : 3 OXYTETRACYCLINE

Formula:
(1) U.S.P. glycerine _____ cc__ 1500
(2) Sodium cyclamate _____ g__ 30
(3) Magnesium chloride .4 $H_2O$_____ g__ 19.8
(4) Oxytetracycline hydrochloride _____ g__ 90.3
(5) Sodium hydroxide (—10% sol'n in glyc.) to pH 8.8. _____ cc__ 230
(6) U.S.P. glycerine, q.s. to 3 liters.

Procedure: Dissolve with stirring in (1) the remaining ingredients in numerical sequence. Add water to certain 600 cc. portions.

Stability data at 37° C. (no water added):

| | Bioassay, mg./g. | Chem. Assay, mg./g. |
|---|---|---|
| Initial | 23.5 | 23.8 |
| 2 Weeks | 20.3 | 29.0 |
| 4 Weeks | 21.2 | 22.6 |
| 8 Weeks | 20.1 | 31.1 |
| 12 Weeks | 19.5 | 23.3 |
| 6 Months | 19.7 | 22.0 |

Water assay=4.73, 4.79% (Karl Fischer).

Stability data at 37° C. (16.2 cc. water added to one 600 cc. portion):

| | Bioassay, mg./g. | Chem. Assay, mg./g. |
|---|---|---|
| Initial | 21.3 | 23.6 |
| 2 Weeks | 21.5 | 28.4 |
| 4 Weeks | 22.1 | 21.6 |
| 8 Weeks | 20.1 | 22.8 |
| 12 Weeks | 20.7 | 22.8 |
| 8 Weeks at 5°C | 21.1 | 22.2 |
| 6 Months | 18.6 | |

Water assay=7.9% (Karl Fischer).

Stability data at 37° C. (31.2 cc. water in 600 cc.):

| | Bioassay, mg./g. | Chem. Assay, mg./g. |
|---|---|---|
| Initial | 19.9 | 22.5 |
| 2 Weeks | 20.3 | 22.9 |
| 4 Weeks | 21.2 | 22.2 |
| 8 Weeks | 20.6 | 21.8 |
| 12 Weeks | 21.2 | 22.0 |
| 6 Months | 18.3 | 20.9 |

Water assay=9.89% (Karl Fischer).

Stability data at 37° C. (61.2 cc. water in 600 cc.):

| | Bioassay, mg./g. | Chem. Assay, mg./g. |
|---|---|---|
| Initial | 20.6 | 22.4 |
| 2 Weeks | 19.7 | 26.3 |
| 4 Weeks | 18.8 | 21.1 |
| 8 Weeks | 19.3 | 21.8 |
| 12 Weeks | 20.8 | 21.6 |
| 6 Months | 18.0 | 19.9 |

Water assay=12.78% (Karl Fischer).

Similar results were obtained up to a total of 25% $H_2O$, but higher amounts than this were clearly deleterious to stability.

D. 1Ca:1Mg:3 OXYTETRACYCLINE

Formula:
- (1) U.S.P. glycerine _____cc__ 500
- (2) Sodium cyclamate _____g__ 10
- (3) $CaCl_2$ (anh.) _____g__ 2.17
- (4) $MgCl_2 \cdot 4H_2O$ _____g__ 3.27
- (5) Oxytetracycline hydrochloride _____g__ 30.1
- (6) NaOH 10% solution to pH 8.5 _____cc__ 72
- (7) U.S.P. glycerine, q.s. to 1.0 liter.

Procedure: Dissolve with stirring in (1) the remaining ingredients in numerical sequence.

Stability data at 37° C.:

|  | Bioassay, mg./g. | Chem. Assay, mg./g. |
|---|---|---|
| Initial | 20.5 | 22.8 |
| 2 Weeks | 20.0 | 21.6 |
| 4 Weeks | 17.3 | 20.7 |
| 8 Weeks | 19.2 | 20.3 |
| 12 Weeks | 16.7 | 19.3 |

E. 2Mg:3 OXYTETRACYCLINE

Formula:
- (1) Polyethylene glycol 400 _____cc__ 250
- (2) Magnesium acetate $\cdot 4H_2O$ _____g__ 4.66
- (3) Oxytetracycline hydrochloride _____g__ 16.76
- (4) Sodium hydroxide (10% in glycerine) to pH 8.5 _____cc__ 40
- (5) Polyethylene glycol 4000 _____g__ 150
- (6) Polyethylene glycol 400, q.s. to 500 cc.

Procedure: Dissolve with stirring in (1) the remaining ingredients in numerical sequence.

Stability data at 37° C.:

|  | Bioassay, mg./g. | Chem. Assay, mg./g. |
|---|---|---|
| Initial | 25.6 | 25.8 |
| 2 Weeks | 23.8 | 23.3 |
| 4 Weeks | 27.0 | 24.8 |
| 8 Weeks | 25.9 | 24.0 |
| 12 Weeks | 24.2 | 24.4 |
| 6 Months | 24.3 | 23.6 |

F. Mg: OXYTETRACYCLINE-PREDNISOLONE SOLUTION

Formula:
- Oxytetracycline base _____g__ 17.5
- Magnesium chloride _____g__ 6.68
- Prednisolone _____g__ 2.5
- Sodium meta-bisulfite _____g__ 0.5
- Ethanol 200 proof _____cc__ 40
- Sodium hydroxide (10% sol.) to pH_____ 7.5
- Propylene glycol, q.s. to 500 cc.

Dissolve the magnesium chloride and the oxytetracycline base in 40 cc. of ethanol. Add the ethanol solution to 250 cc. of propylene glycol and neutralize to pH 7.5 with sodium hydroxide. Add the remaining ingredients and q.s. with propylene glycol to 500 cc.

Stability data at 37° C.:

| Time in Weeks | Oxytetracycline Bioassay, mg./g. | Prednisolone Assay, mg./cc. |
|---|---|---|
| 0 | 24.1 | 4.6 |
| 2 | 24.6 | 4.8 |
| 4 | 26.7 | 5.0 |
| 8 | 24.2 | 4.8 |
| 12 | 26.1 | 5.0 |

G. 2Zn:3 OXYTETRACYCLINE

Formula:
- (1) Glycerine _____cc__ 500
- (2) Sodium cyclamate _____g__ 10
- (3) Sorbitol _____g__ 50
- (4) Sodium ascorbate _____g__ 22.25
- (5) $ZnCl_2$ _____g__ 5.94
- (6) Terramycin HCl _____g__ 33.5
- (7) NaOH (10% in glycerine) to pH 8.5 _____cc__ 72
- (8) Glycerine, q.s. to 1 liter.

Density: 1.27.

Procedure: Dissolve with stirring in (1) the remaining ingredients in numerical order.

Stability data at 37° C.:

|  | Bioassay, mg./g. | Chem. Assay, mg./g. |
|---|---|---|
| IA | 21.6 | 22.9 |
| 2 Weeks | 17.4 | 23.2 |
| 4 Weeks | 18.3 | 24.8 |
| 8 Weeks | 16.0 | 19.3 |
| 12 Weeks | 15.0 | 18.9 |
| 8 Weeks, 25° C | 20.4 |  |

When the proportion of zinc chloride is increased to provide a 1:1 zinc oxytetracycline solution, the zinc oxytetracycline is insoluble from pH 8–10. Therefore, the pH of such a solution is adjusted within the range pH 7–8.

H. 1Al:1 OXYTETRACYCLINE

Formula:
- (1) Glycerine _____cc__ 500
- (2) Sorbitol (70% aqueous) _____g__ 100
- (3) Sodium sucaryl-saccharin (10–1) ___g__ 10
- (4) Sodium ascorbate _____g__ 22.5
- (5) Aluminum chloride $\cdot 6H_2O$ _____g__ 24.0
- (6) Terramycin base _____g__ 46.0
- (7) Ethanol _____cc__ 80
- (8) NaOH (10% in glycerine), pH 3.5 __cc__ 26.0
- (9) Glycerine, q.s. to 1 liter.

Procedure: Dissolve with stirring in (1) ingredients 2, 3, and 4 in order. Dissolve $AlCl_3 \cdot 6H_2O$ and Terra base in ethanol. Add ethanol solution to the glycerine solution (1). Adjust pH and q.s.

Density: 1.26—viscosity 675 cps.

Stability data at 37° C.:

|  | Bioassay, mg./g. | Chem. Assay, mg./g. |
|---|---|---|
| IA | 24.3 | 25.2 |
| 2 Weeks | 26.4 | 27.6 |
| 4 Weeks | 23.5 | 29.2 |
| 8 Weeks | 22.3 | 26.8 |
| 12 Weeks | 19.7 | 19.8 |
| 15 Weeks, 25° C | 28.2 |  |

I. 2Ca:1 OXYTETRACYCLINE

- (1) Glycerine _____cc__ 500
- (2) Sodium cyclamate _____g__ 10
- (3) Calcium acetate $\cdot H_2O$ _____ 20.66
- (4) Oxytetracycline hydrochloride _____ 30.1
- (5) NaOH (10% in glycerine), pH 9.0 __cc__ 75
- (6) Glycerine, q.s. to 1 liter.

Procedure: Dissolve with stirring in (1) the remaining ingredients in numerical order.

Stability data:

| | Bioassay, mg./g. | Chem. Assay, mg./g. |
|---|---|---|
| IA | 19.9 | 23.1 |
| 2 Weeks, 37° C | 22.5 | 23.0 |
| 4 Weeks, 37° C | 23.1 | 23.7 |
| 8 Weeks, 37° | 21.3 | 22.9 |
| 12 Weeks, 37° C | 21.0 | 23.0 |
| 12 Weeks, 5° C | 19.0 | |
| 6 Months, 37° C | 17.7 | 18.6 |

J. 2Mg : 3 OXYTETRACYCLINE (1) Glycerine _____ cc__ 500
(2) Sodium cyclamate _____ g__ 10.0
(3) Magnesium acetate _____ g__ 33.6
(4) Oxytetracycline hydrochloride _____ g__ 120.4
(5) Sodium hydrochloride (10% soln.) to pH 8.5 _____ cc__ 280
(6) F.D. & C. No. 1 _____ g__ 0.17
(7) F.D. & C. No. 2 _____ g__ 0.7
(8) D & O Maraschino No. 9110 _____ cc__ 2.4
(9) D & O Maraschino No. 1991 _____ cc__ 0.6
(10) Glycerine, q.s. to 1 liter.

Procedure: Dissolve in (1) the remaining ingredients in numerical order.

Stability data:

| | Bioassay, mg./g. | Chem. Assay, mg./g. |
|---|---|---|
| IA | 80.3 | 81.7 |
| 2 Weeks, 50° C | 70.5 | 80.4 |
| 4 Weeks, 50° C | 69.7 | 79.2 |
| 6 Weeks, 50° C | 79.9 | 79.2 |
| 8 Weeks, 37° C | 79.2 | 80.1 |
| 12 Weeks, 37° C | 72.2 | 80.0 |
| 18 Weeks, 50° C | 69.1 | 73.4 |

K. 2Mg : 3 OXYTETRACYLINE (1) Glycerine _____ cc__ 500
(2) Sorbitol _____ gm__ 50
(3) $MgCl_2 \cdot 4H_2O$ _____ gm__ 7.3
(4) Sodium cyclamate _____ 10.0
(5) Sodium ascorbate _____ 22.5
(6) Oxytetracyline hydrochloride _____ 33.5
(7) NaOH (10% soln. in glycerine) to pH 10.0 _____ cc__ 96
(8) Glycerine, q.s. to 1 liter.

Procedure: Dissolve with stirring in (1) the remaining ingredients in numerical order.

Density: 1.27.
Stability data at 37° C.:

| | Bioassay, mg./g. | Chem. Assay, mg./g. |
|---|---|---|
| IA | 24.2 | 26.8 |
| 2 Weeks | 21.9 | 26.3 |
| 4 Weeks | 21.9 | 25.2 |
| 8 Weeks | 22.6 | 24.9 |
| 12 Weeks | 23.3 | 24.3 |
| 6 Months | 22.8 | 23.8 |

Example IV

Tetracycline metal salt dosage forms according to this invention have also been prepared in numbers. Representative formulations, corresponding to the above oxytetracycline preparations and other orally and topically administrable solutions, are as follows.

Material: Grams per 80 liters
- Magnesium tetracycline [1] _____ [2] 4131.20
- Ascorbic acid _____ 2560.00
- Sodium cyclamate _____ 424.00
- Saccharin sodium _____ 42.40
- Imitation tangerine (Cosmo NA) _____ 266.4
- Glycerine, q.s. to 80.0 liters.

[1] Pharmaceutical grade of very good color, low moisture content (under 20% $H_2O$—Karl Fischer method—preferably lower, having the composition $Mg_3$ tetracycline).
[2] Based on a chemical potency of 807 u./mg.+66.7% overage (or X 100/60).

(1) Blend thoroughly together lump-free antibiotic, ascorbic acid, sodium sucaryl and sodium saccharin for ½ hour.
(2) Paste up the powder blend from step (1) in a Hobart-type mixer, using approximately 15 liters of glycerine per 80 liter batch. (This may have to be done in several steps if the equipment used is not adequate to handle all of the solids for pasting at one time. If the pasting is carried out by several repeated steps, the same glycerine-powder ratio should be followed.) After each pasting operation, transfer the thick slurry into the kettle or tank to be used for the entire batch.
(3) The pasting equipment should be rinsed clean with glycerine after the final pasting, and the rinsings transferred to the batch. Three thorough rinsings should be adequate.
(4) While stirring the slurry in the kettle, slowly add up to ½ of the remaining glycerine.
(5) Add the flavor slowly with rapid stirring. Stir until the flavor is well dispersed.
(6) Add the remaining glycerine and stir well.
(7) Saturate the batch with oil-pumped nitrogen.
(8) Stir the batch slowly, maintaining a temperature of 25° C. or less, until most of the solids have dissolved. To check state of solution, make a thin smear with a representative sample and observe.
(9) When most of the solids have dissolved, pass the entire batch through a Scott-Williams Hydropulse at 2500 p.s.i. (or a Manton-Gaulin homogenizer at comparable settings, using cooling water).
(10) Pass the homogenized solution into a holding tank in which the contents can be maintained at a temperature of 25° C. or less and can be agitated slowly. Maintain a blanket of nitrogen over the batch.
(11) When all solids appear to be in solution, and the bubbles have escaped leaving a clear amber solution, free from residue, the solution may then be flushed with nitrogen, stirred well and subdivided.

Stability data at 37° C.: Bio assay, mg./g.
- Initial _____ 19.8
- 2 weeks _____ 17.9
- 4 weeks _____ 21.1
- 8 weeks _____ 19.2

Formula:
(1) U.S.P. glycerine _____ cc__ 500.00
(2) Sodium cyclamate _____ g__ 10.0
(3) Magnesium acetate _____ g__ 24.52
(4) Tetracycline hydrochloride _____ g__ 27.55
(5) Triethanolamine to pH 7 _____ cc__ 25.0
(6) 10% NaOH in glycerine sol'n to pH 70 cc__ 8.5
(7) U.S.P. glycerine, q.s. to 1.0 liter.

Procedure: Dissolve with stirring in U.S.P. glycerine (1) the remaining ingredients in numerical order.

Density: 1.25.

Stability data at 37° C.:

|  | Bioassay, mg./g. | Chem. Assay, mg./g. |
|---|---|---|
| Initial | 21.6 | 25.1 |
| 2 Weeks | 20.8 | 21.9 |
| 4 Weeks | 18.9 | 22.7 |
| 8 Weeks | 19.7 | 22.2 |
| 12 Weeks | 18.9 | |

Formula:
  (1) U.S.P. glycerine _____cc__ 500.00
  (2) Calcium chloride anhydrous (0.1684 mole) _____g__ 18.69
  (3) Sodium cyclamate _____g__ 10.00
  (4) Tetracycline hydrochloride (0.05616 mole) _____g__ 27.55
  (5) Triethanolamine _____cc__ 25
  (6) 10% NaOH in glycerine to pH 8.0.
  (7) U.S.P. glycerine, q.s. to 1.0 liter.

Procedure: Dissolve with stirring in (1) the remaining ingredients in numerical order.
Density: 1.25.
Stability data at 37° C.:

|  | Bioassay, mg./g. | Chem. Assay, mg./g. |
|---|---|---|
| Initial | 19.9 | 19.6 |
| 2 Weeks | 21.1 | 21.4 |
| 4 Weeks | 18.5 | 20.5 |
| 8 Weeks | 19.6 | 21.04 |
| 12 Weeks | 20.0 | 20.6 |

Formula:
  (1) U.S.P. glycerine _____cc__ 500.00
  (2) Sodium cyclamate _____g__ 10.0
  (3) Calcium acetate .H$_2$O _____g__ 29.68
  (4) Tetracycline hydrochloride _____g__ 27.55
  (5) Triethanolamine _____cc__ 25
  (6) 10% NaOH in glycerine to pH 9.0 cc__ 60.0
  (7) Glycerine, q.s. to 1.0 liter.

Procedure: Dissolve with stirring in (1) the remaining ingredients in numerical order.
Density: 1.25.
Stability data at 37° C.:

|  | Bioassay, mg./g. | Chem. Assay, mg./g. |
|---|---|---|
| Initial | 21.3 | 21.3 |
| 2 weeks | 21.4 | 21.6 |
| 4 weeks | 20.7 | 26.6 |
| 8 weeks | 20.1 | 21.0 |
| 12 weeks | 20.6 | 21.4 |
| 6 months | 18.1 | 20.6 |

Formula:
  (1) U.S.P. glycerine _____cc__ 500.00
  (2) Calcium acetate .H$_2$O _____g__ 29.7
  (3) Sodium cyclamate _____g__ 10.0
  (4) Sulfosalicylic acid (1 mole) _____g__ 14.3
  (5) Triethanolamine _____cc__ 25.0
  (6) Tetracycline hydrochloride _____g__ 27.55
  (7) 10% NaOH in glycerine in pH 9__cc__ 113.0
  (8) F.D. & C. Red No. 1 _____g__ 0.17
  (9) F.D. & C. Red No. 2 _____g__ 0.7
  (10) D. & O. raspberry No. 5250 _____cc__ 2.6
  (11) Polak imit. raspberry No. 1534__cc__ 0.4
  (12) P. & S. pharma. flav. No. 53 _____cc__ 1.0
  (13) U.S.P. glycerine, q.s. to 1.0 liter.

Procedure: Dissolve with stirring in (1) the remaining ingredients in numerical order.
Density: 1.25.

Stability data at 37° C.:

|  | Bioassay, mg./g. | Chem. Assay, mg./g. |
|---|---|---|
| Initial | 20.6 | 19.7 |
| 2 weeks | 18.9 | 19.9 |
| 4 weeks | 19.4 | 20.6 |
| 8 weeks | 18.5 | 20.4 |
| 12 weeks | 21.8 | 20.2 |
| 6 months | 18.1 | 19.2 |

Formula:
  (1) Polyethylene glycol 300 _____cc__ 500.00
  (2) MgCl$_2$.4H$_2$O _____g__ 28.19
  (3) Tetracycline hydrochloride _____g__ 27.55
  (4) Triethanolamine _____cc__ 25
  (5) 10% NaOH in glycerine to pH 8.5__cc__ 125
  (6) Polyethylene glycol, q.s. to 1.0 liter.

Procedure: Dissolve with stirring in polyethylene glycol 300 (1) the remaining ingredients in numerical order.
Density: 1.16. Water assay=2.72% (Karl Fischer).
Stability data at 37° C.:

|  | Bioassay, mg./g. | Chem. Assay, mg./g. |
|---|---|---|
| IA | 23.4 | 22.7 |
| 2 Weeks | 18.7 | 22.9 |
| 4 Weeks | 17.6 | 22.6 |
| 8 Weeks | 20.3 | 22.7 |
| 12 Weeks | 18.8 | 22.1 |
| 6 Months | 19.8 | 22.6 |

Formula:
  (1) Propylene glycol _____cc__ 800
  (2) Benzocain, U.S.P. _____g__ 51
  (3) Calcium chloride anh _____ 3.46
  (4) Tetracycline hydrochloride _____ 5.1
  (5) NaOH (10% in propylene glycol) to pH 8.5 _____cc__ 15
  (6) Propylene glycol, q.s. to 1 liter.

Procedure: Dissolve with stirring in (1) the remaining ingredients in numerical order.
Density: 1.04.
Stability data at 37° C.:

|  | Bioassay, mg./g. | Chem. Assay, mg./g. |
|---|---|---|
| IA | 4.8 | 4.5 |
| 2 Weeks | 4.6 | 4.25 |
| 4 Weeks | 4.3 | 4.2 |
| 8 Weeks | 4.1 | 4.3 |
| 12 Weeks | 4.4 | 3.8 |

Formula:
  (1) U.S.P. glycerine _____cc__ 500.00
  (2) Sodium cyclamate _____g__ 10.00
  (3) AlCl$_3$.6H$_2$O _____g__ 40.7
  (4) Tetracycline hydrochloride _____g__ 27.55
  (5) Sodium ascorbate _____g__ 22.25
  (6) 10% NaOH in glycerine to pH 9.
  (7) U.S.P. glycerine, q.s. to 1.0 liter.

Procedure: Dissolve with stirring in U.S.P. glycerine (1) the remaining ingredients in numerical order.
Density: 1.27.
Stability data at 37° C.:

|  | Bioassay, mg./g. | Chem. Assay, mg./g. |
|---|---|---|
| IA | 15.6 | 17.8 |
| 2 Weeks | 12.9 | 18.3 |
| 4 Weeks | 12.0 | 17.7 |
| 8 Weeks | 12.6 | 17.1 |
| 12 Weeks | 10.6 | 16.8 |

The decrease in bioassay observed while stability on the basis of the chemical assay is retained is thought to reflect epimerization of the product (C. R. Stephens et al., J. Am. Chem. Soc., 78, 1515 (1956)) in solution, particularly since further losses in bioassay are not observed after the above value is reached. Presumably, this represents the equilibrium point. If higher potencies on the basis of the bioassay are desired, higher concentrations of antibiotic and metal salt are employed in the formulation charge.

As previously noted, it is preferred to have the tetracycline solutions substantially anhydrous. Generally up to about 5% water (such as is naturally contained in U.S.P. glycerine, for instance) can be tolerated without deleteriously affecting their stability, however.

Example V

The following formulation is especially adapted for intramammary injection in the treatment of bovine mastitis. A 10 ml. dose is employed.

2Mg:1 OXYTETRACYCLINE

Material:

| | |
|---|---|
| Oxytetracycline hydrochloride, U.S.P. XV grams/liter | 44.842 |
| Magnesium chloride hexahydrate, analytical reagent grade grams/liter | 36.697 |
| Sodium hydroxide, U.S.P. XV do | ca. 12.000 |
| Propylene glycol U.S.P. XV cc | 760.000 |
| Prednisolone, pharmaceutical grade mg | 0.400 |
| Distilled water, U.S.P. XV, q.s. ad 1000.000 cc | |

Procedure:

(1) Dissolve the magnesium chloride hexahydrate in 150 ml. distilled water.
(2) Prepare a 50% weight to weight solution of sodium hydroxide in distilled water (500 g. NaOH in 500 ml. water).
(3) Combine the magnesium chloride solution with the propylene glycol.
(4) Add the oxytetracycline hydrochloride to the solution of magnesium chloride, propylene glycol, and water from 3 above and mix rapidly.
(5) Begin to neutralize immediately and rapidly adjust to pH 7.5 with the sodium hydroxide solution from 2 above.
(6) When solution is complete dilute to volume with the remainder of the water and carefully adjust to pH 8.0.
(7) Add the prednisolone and stir until dissolved.
(8) Filter, subdivide and package. The preparation at this stage is a bright yellow solution.

Stability data:

| Storage Temperature | Initial Bio Assay, mg./gm. | 2 Weeks | 5 Weeks | 7 Weeks |
|---|---|---|---|---|
| 5° | 26.23 | | 26.23 (100%) | 25.95 (99%) |
| 25° | | 26.08 (99%) | 26.49 (101%) | 24.78 (95%) |
| 37° | | | 27.00 (103%) | 25.55 (97%) |
| 50° | | 25.15 (96%) | 26.90 (103%) | 24.63 (94%) |
| 5° | 26.23 | | 26.87 (101%) | 24.92 (95%) |
| 25° | | 25.95 (96%) | 27.02 (101%) | 25.50 (97%) |
| 37° | | | 26.70 (99%) | 25.55 (97%) |
| 50° | | 25.54 (95%) | 26.08 (97%) | 24.40 (93%) |

In the assay data given above each figure represents the average of six (6) assays. The average may however, be uniformly high or uniformly low if individual assays were obtained on the same day.

Example VI

A further use for the valuable solutions of the present invention is in the preparation of suppositories. For this purpose polyethylene glycols which have a molecular weight greater than about 1300 which have a plastic or solid consistency at room temperature are employed. They are melted by heating to about 65° C. and employed in the liquid state in preparing the solutions.

2Mg:3 OXYTETRACYCLINE

Formula (Remington's "Practice of Pharmacy," Base C, p. 361):

(1) Carbowax 1540 (polyethylene glycol, average molecular weight 1300–1600) g 200
(2) $MgCl_2 \cdot 4H_2O$ (in 3.0 ml. $H_2O$) g 3.0
(3) Oxytetracycline hydrochloride g 15.0
(4) Sodium hydroxide (10% solution in glycerine) pH 8.6 cc 40
(5) Carbowax 6000 (polyethylene glycol, average molecular weight 6000–7500) g 150
(6) Carbowax 1540, q.s. to 500 cc.

Procedure: Melt the Carbowaxes and add ingredients in numerical sequence with stirring. Pour into molds and cool.

2Mg:3 OXYTETRACYCLINE

Formula:

(1) Carbowax 6000 g 300
(2) $MgCl_2 \cdot 4H_2O$ g 3.3
(3) Oxytetracycline hydrochloride g 15.0
(4) NaOH (10% in glycerine) cc 80
(5) Carbowax 6000, q.s. to 500 cc.

Procedure: Melt the Carbowax 6000 at 65° C. and add the remaining ingredients in numerical order with stirring. Cool. This preparation is then suitable as a granulation in a tableted suppository.

The magnesium chloride used in the above examples indicated as $MgCl_2 \cdot 4H_2O$ was prepared from analytical reagent grade magnesium chloride hexahydrate by drying for 24 hours in a vacuum at 50° C. Material dried in this fashion contained from 40–45% water by the Karl Fischer assay corresponding roughly to the tetrahydrate.

What is claimed is:

1. A therapeutic composition which comprises a solution of at least one tetracycline-type antibiotic selected from the class consisting of magnesium tetracycline having a molar ratio of magnesium to tetracycline of about 3:1, calcium tetracycline having a molar ratio of calcium to tetracycline of about 3:1, aluminum tetracycline having a molar ratio of aluminum to tetracycline of about 3:1, magnesium oxytetracycline having a molar ratio of magnesium to oxytetracycline of from about 1:3 to 3:1, calcium oxytetracycline having a molar ratio of calcium to oxytetracycline of from about 1:3 to 3:1, zinc oxytetracycline having a molar ratio of zinc to oxytetracycline of about 1:3 to 3:1, and aluminum oxytetracycline having a molar ratio of aluminum to oxytetracycline of about 1:3 to 3:1 in a polyhydric alcohol solvent selected from the class consisting of glycerine, polyethylene glycol, propylene glycol, mixtures thereof, and said solvents containing up to about 20% by volume of a non-toxic alkanol selected from the group consisting of sorbitol and ethanol, at a pH substantially between 7.0 and 10.

2. A composition according to claim 1 wherein the alcohol is glycerine.

3. A composition according to claim 1 wherein the alcohol is polyethylene glycol.

4. A composition according to claim 1 wherein the alcohol is propylene glycol.

5. A composition according to claim 1 wherein the antibiotic is magnesium tetracycline having a molar ratio of magnesium to tetracycline of about 3:1.

6. A composition according to claim 1 wherein the antibiotic is calcium tetracycline having a molar ratio of calcium to tetracycline of about 3:1.

7. A composition according to claim 1 wherein the antibiotic is magnesium oxytetracycline having a molar ratio of magnesium to oxytetracycline of from about 1:3 to 3:1.

8. A composition according to claim 1 wherein the antibiotic is calcium oxytetracycline having a molar ratio of calcium to oxytetracycline of from about 1:3 to 3:1.

References Cited in the file of this patent

UNITED STATES PATENTS

| | | |
|---|---|---|
| 2,640,842 | Weidenheimer et al., | June 2, 1953 |
| 2,699,054 | Conover | Jan. 11, 1955 |

FOREIGN PATENTS

| | | |
|---|---|---|
| 672,510 | Great Britain | May 21, 1952 |
| 507,692 | Belgium | June 2, 1952 |
| 503,866 | Canada | June 22, 1954 |
| 201,633 | Australia | Apr. 28, 1955 |

OTHER REFERENCES

Drug Trade News, January 19, 1953, page 52.

J.A.Ph.A., January 1952, pages 27–29.

Regna et al.: J.A.C.S., vol. 73, September 1951, pp. 4211–4215.

The Editor, J.AP.P.A., Practical Pharmacy Ed., April 1950, p. 231, "Comparative Studies on Terramycin and Aureomycin."